Sept. 13, 1949.　　　　S. HILLER, JR　　　　2,481,749
REACTION JET TORQUE COMPENSATION FOR HELICOPTERS
Filed Nov. 25, 1946　　　　　　　　　　4 Sheets-Sheet 1
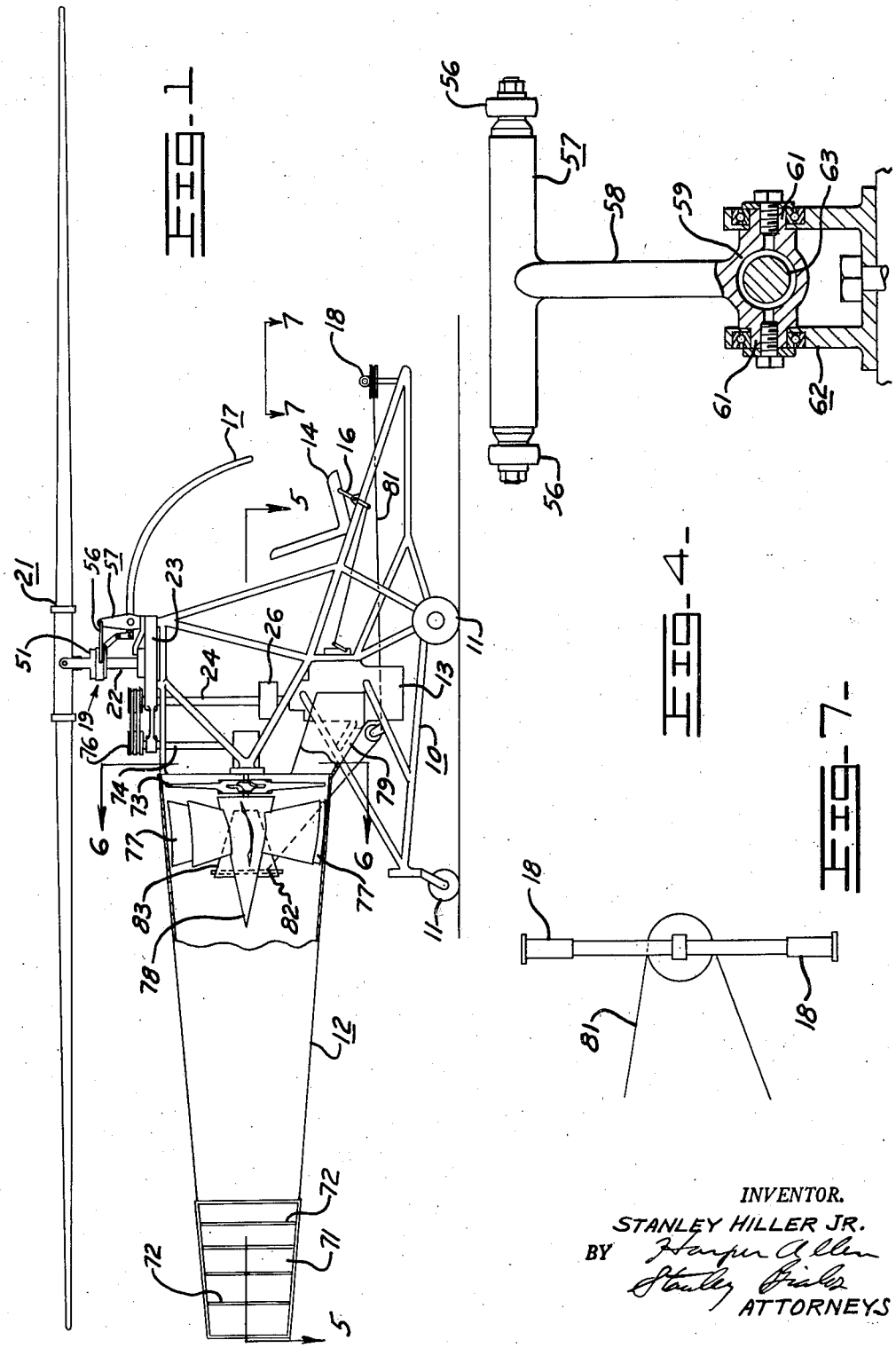
INVENTOR.
STANLEY HILLER JR.
BY
ATTORNEYS

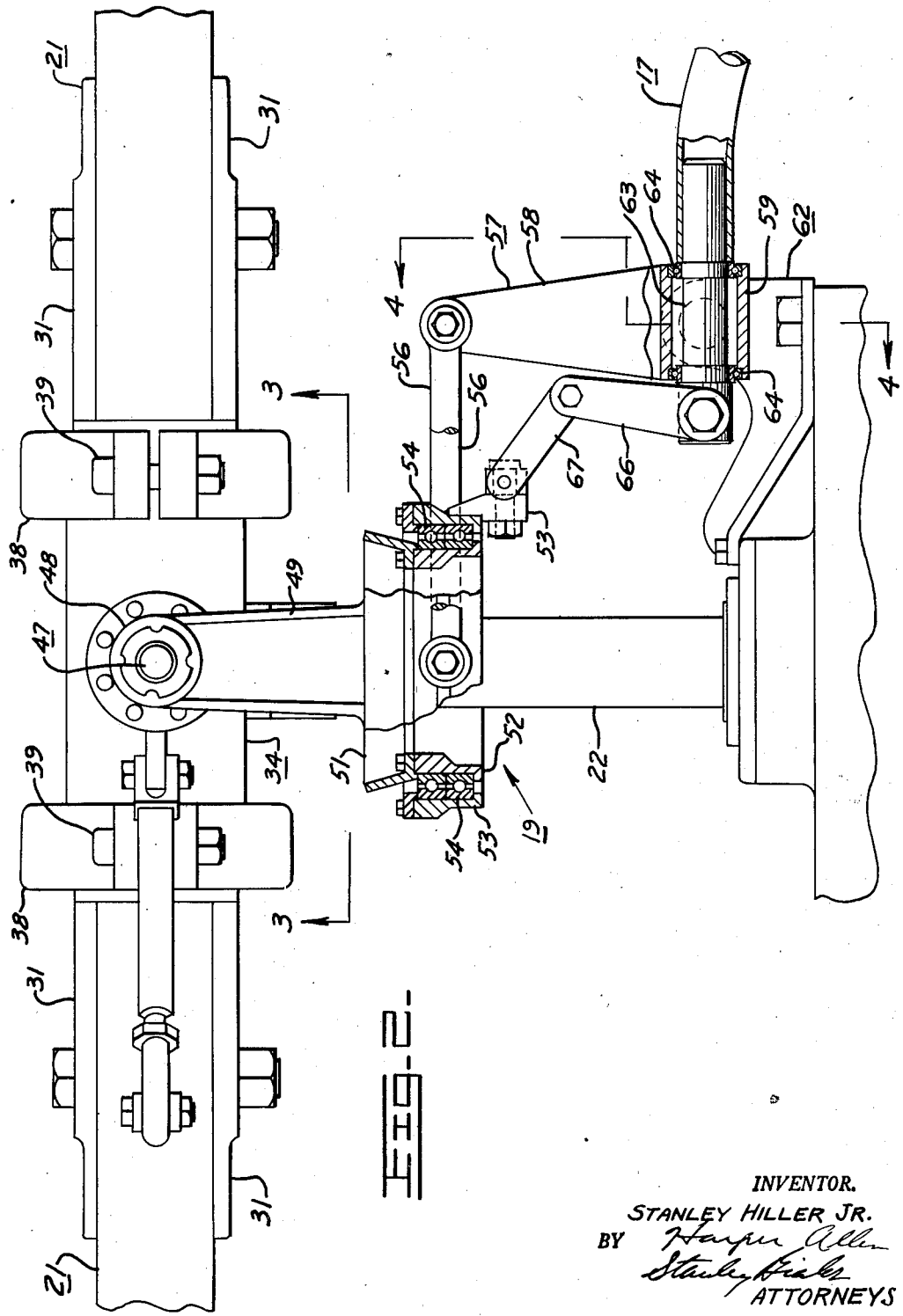

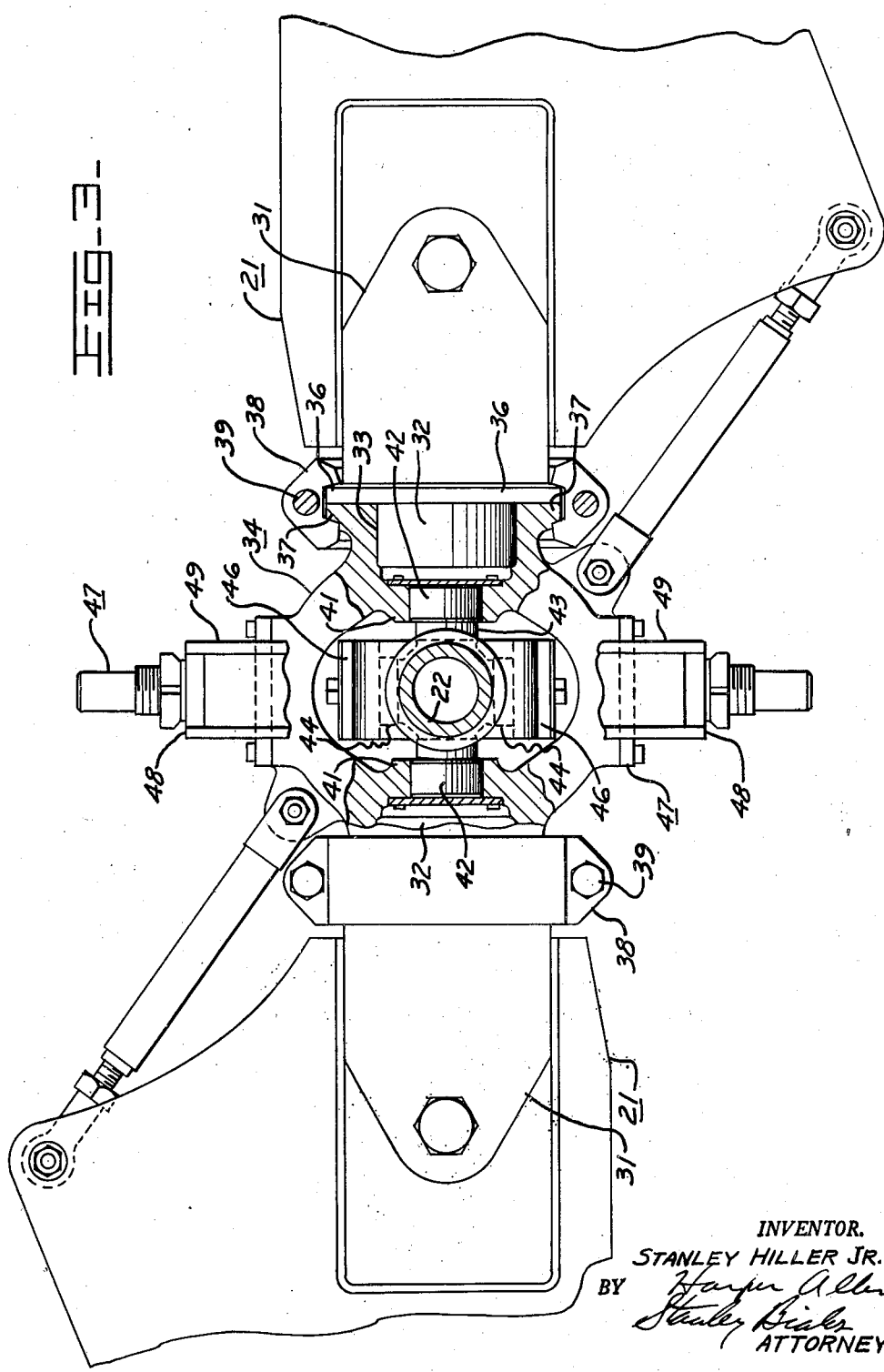

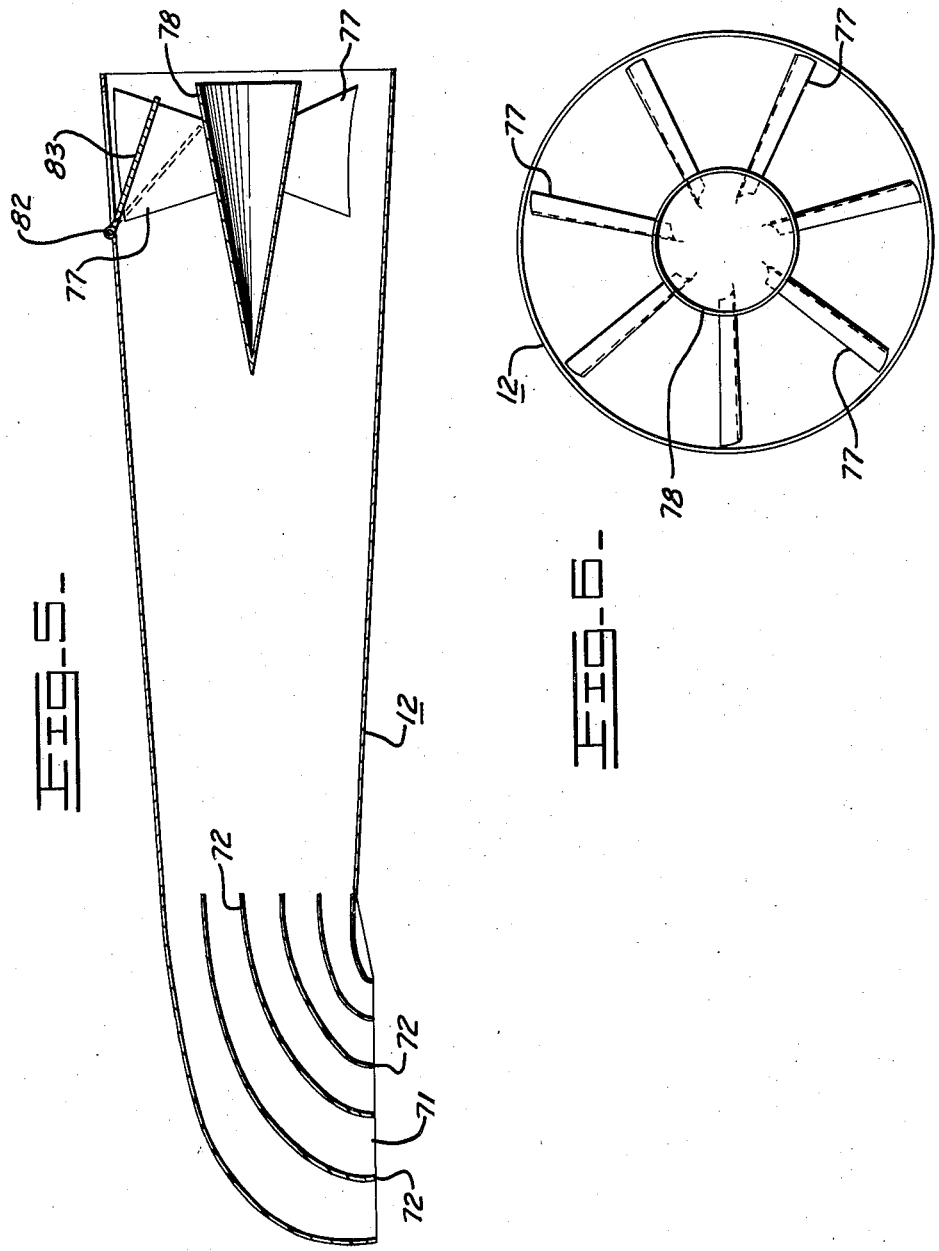

Patented Sept. 13, 1949

2,481,749

UNITED STATES PATENT OFFICE 2,481,749

REACTION JET TORQUE COMPENSATION FOR HELICOPTERS

Stanley Hiller, Jr., Menlo Park, Calif., assignor to United Helicopters, Inc., Palo Alto, Calif., a corporation of California Application November 25, 1946, Serial No. 712,181

2 Claims. (Cl. 244—17.19)

This invention relates to helicopters and concerned more particularly with the provision of a helicopter having improved apparatus and methods for compensating for the torque reaction of the wing structure.

In helicopters of the single wing type, the previous practice in effecting compensation for the torque of the wing is to provide an auxiliary propeller at the tail of the craft disposed to compensate for the torque. This practice, while successful in operation, embodies several disadvantageous features. The most prominent of these features are the extra weight entailed in mounting the auxiliary propeller at the tail of the aircraft and the extra load imposed on the power plant for operation of this propeller together with the long drive shaft or drive connection which must be employed. This type of construction is further complicated by the necessity of mounting the rear torque-compensating propeller in a vertically displaced position so that it is not materially affected by the downwash of the wing structure and also imposes certain limitations on the overall length of the wing structure without excessive length of the helicopter itself.

In accordance with the instant invention, the problem of torque compensation for single wing helicopters is solved by providing an air or gas jet whose discharge is directed from the tail of the fuselage in the proper direction to compensate for the torque reaction. Preferably, this jet is directed through the tunnel-shaped fuselage of the aircraft so that the propeller for creating the air jet is closely adjacent the power plant and in addition to creating the air jet it also serves as a means for passing cooling air over the engine. This results in a greater percentage of effective engine horsepower available for flight of the helicopter.

It is a general object of the invention therefore to provide a jet controlled helicopter.

A further object of the invention is to provide the entire torque compensation for a single wing helicopter by means of an air or gas jet.

Another object of the invention is to provide an improved helicopter containing the foregoing objects in which the air jet is used for control of turning of the helicopter.

A further object of the invention is to provide a helicopter of the single wing type having a simplified system of controls for maneuvering the craft.

Other objects and advantages of the invention will be apparent from the following description of a preferred embodiment thereof as illustrated in the accompanying drawings, in which:

Figure 1 is a schematic side elevational view partially in section of the helicopter embodying the invention.

Figure 2 is an enlarged elevational view partially in section of the wing mounting and control mechanism.

Figure 3 is a bottom plan view of the universal mounting of the wing structure.

Figure 4 is a fragmentary sectional view of a portion of the control mechanism taken as indicated by the line 4—4 in Figure 2.

Figure 5 is a sectional plan view of the jet tunnel or fuselage of the helicopter.

Figure 6 is a front elevational view of the fuselage.

Fig. 7 is a plan view taken along line 7—7 of Fig. 1 showing the foot pedal cable connections.

Referring to Figure 1, there is illustrated a helicopter including a body or frame 10 formed in part of tubular struts having landing gear 11 mounted thereon. Included in the body structure is a fuselage or air tunnel 12 suitably supported upon the tubular frame 10. The helicopter includes also a power plant or engine 13 located immediately to the rear of an operator's compartment including a seat 14, a throttle control 16 for the engine, a directional control stick 17, and foot pedals 18. Also, a drive head structure 19 is provided which carries the wing structure 21, as described hereinafter. The drive head structure includes a drive shaft 22 which is driven through a gear mechanism 23, a drive shaft 24, and a clutch 26 from the engine 13.

Referring to Figures 2 and 3, the two wing sections of the wing structure are each clamped at their inner ends between bracket extensions 31 of a mounting post or stub shaft 32 which is seated in an annular recess 33 of the supporting hub 34. The mounting shaft 32 is provided with an annular flange 36 mating with a similar flange 37 of the supporting hub 34 to receive opposite clamping brackets 38 having securing and clamping bolts 39 associated therewith. The supporting hub 34 is provided with opposite bosses 41 apertured to receive opposite trunnions or bearing portions 42 of a cross-shaped universal support element 43. The cross-shaped supporting element 43 is also provided with opposite shorter trunnions or bearing portions 44 which are journalled in opposite bosses 46 of a forked top extension of the drive shaft 22.

It is seen from the above description that the wing structure is mounted for universal tilting movement at the upper end of the drive shaft and that the universal mounting is encompassed by the wing structure and has its pivotal axes substantially coincident with the general plane of the wing structure.

To effect control of the tilting movement of the wing structure with reference to its universal supporting mounting, the wing hub 34 has secured thereon opposite trunnions 47 on which the bosses 48 of a pair of downwardly extending control arms 49 are journalled by means of suitable bearings. The depending arms 49 are integrally formed with a ring section 51 of the wobble mechanism 19 which is secured by suitable cap screws on an inner part or ring 52 of the wobble mechanism about which an outer or stationary part 53 is journalled by bearings 54.

From the above description it will be seen that the wobble mechanism is pivotally connected to the wing structure about an axis at right angles to the longitudinal axis of the wing structure and coincident with the pivotal mounting axis of the wing structure on the drive shaft.

As previously stated, in general, the control stick 17 is connected to the wobble mechanism 19 to exert a tilting effect thereon in both a fore and aft direction and in a lateral direction at right angles to the fore and aft direction. To effect the fore and aft adjustment of the wobble mechanism the outer part or ring 53 thereof is connected by respective control links 56 to the horizontal transverse bar of a T-shaped link 57 whose vertical leg 58 (Figures 2 and 4) is provided with an apertured boss 59 having its axis extending in a fore and aft direction and having laterally extending trunnions 61 journalled in a mounting bracket 62 on the frame of the helicopter. As seen in Figure 2, the rear end 63 of the control stick 17 is journalled by bearings 64 within the boss 59 so that fore and aft movement of the control stick 17 will cause pivoting movement of the control link 57, fore and aft movement of the connecting links 56, and consequently fore and aft tilting of the wobble mechanism 19.

In order to control lateral movement of the wobble mechanism, the end portion 63 of the control stick 17 is connected to a toggle mechanism including parallel links 66 and a V-shaped link 67, the latter of which is universally pivoted on the outer part 53 of the wobble mechanism.

The above described control mechanism is of the type disclosed and claimed in my copending application, Serial No. 712,182, filed Nov. 25, 1946 for Helicopters.

The compensation of the torque reaction of the wing structure, as previously stated, is effected by the creation of a laterally directed air jet at the tail of the aircraft. For this purpose the fuselage 12 (Figures 1, 5 and 6) is formed as a rearwardly tapering tunnel of sheet metal or the like provided with a laterally directed rear discharge opening 71 to which a series of vertically disposed curved vanes or fins 72 lead the jet of air to its discharge so that a sidewise torque is produced by changing the direction of flow of air or other gas. At the entrance and of the tunnel a fan-type propeller 73 is journalled on the frame of the aircraft and is driven through a shaft 74 and a pulley drive 76 from the drive shaft 24. Immediately to the rear of the fan 73, an annular array of radially disposed air directing vanes 77 are mounted extending between the wall of the fuselage 12 and a central cone-shaped support 78 whose large end is disposed immediately rearwardly of the hub of the propeller or fan 73. The curvature of the vanes 77 is selected to exert a straightening effect on the path of the air as it is discharged from the propeller 73. If desired, the exhaust gases from the engine or power plant 13 may be injected into the tunnel or fuselage 12 through a duct means 79 which extends from the power plant and to the tunnel and thereby also serves as a means for drawing cooling air past the engine. The exhaust gases not only add to the volume of gas in the tunnel, but also serve to heat the air in the tunnel to increase its volume and thereby also increase its discharge pressure. If desired, additional means such as a rearwardly directed flame may be employed in the tunnel for additional heating of the gas flowing therethrough.

For use of the air jet in controlling turning of the helicopter, the foot pedals 18 (Figure 1) are connected by a suitable cable mechanism 81 to the pivotal support 82 of by-pass valve or flap 83 which is mounted on the side wall of the tunnel opposite to the jet discharge opening 71 and controls the opening and closing of a by-pass opening therein. The valve 83 is tapered to open between a pair of adjacent vanes 77 and is in the half-open position shown in full lines in Figure 5 for straight ahead flight. By operation of the foot pedals 18, the valve 83 can be turned in either direction from this central position to cause turning of the helicopter body to the right or left by increasing and decreasing the effective volume of the jet in controlling torque reaction of the wing structure.

In operation of the helicopter with the wing structure rotating clockwise, as viewed from above the craft, and with the propeller fan 73 in operation, the reaction from the jet discharge at the tail of the aircraft compensates for the torque reaction of the wing structure on the helicopter body. In this connection the size, speed of rotation and pitch of the blades of the propeller fan are so selected with respect to the characteristics of the wing structure and the torque reaction therefrom to provide straight ahead flight of the helicopter with the by-pass valve 83 in half open position. It will be noted that as the engine speed increases the speed of the wing structure and of the propeller fan increase proportionately to maintain a proper balance of the torque and jet reactions. By operation of the foot pedals 18 and further opening or closing of the by-pass valve 83, the effectiveness of the jet discharge is changed to accomplish turning of the helicopter body in accordance with the directional movement of the by-pass valve 83.

While I have shown certain preferred embodiments of the invention, it will be apparent that the invention is capable of further variation and modification and its scope should be limited only by the scope of the claims appended hereto.

I claim:

1. A helicopter comprising a wing structure rotatable about an upright axis, an elongated gas tunnel having an inlet opening at its front end and a laterally directed rear discharge opening in one side thereof, a blower adjacent the inlet opening of the tunnel and rotatable about an axis extending longitudinally of the tunnel for creating a jet of gas through said tunnel for discharge through said rear opening to compensate for the torque effect of said wing structure, the side wall of said tunnel having a lateral by-pass opening adjacent said inlet opening through which some of said gas jet can be by-passed for controlling turning of the helicopter, and an inwardly opening flap by-pass valve having one end pivotally mounted adjacent the rear of said by-pass opening for controlling the by-pass of said gas jet through the by-pass opening.

2. A helicopter comprising a wing structure rotatable about an upright axis, an elongated gas tunnel having an inlet opening at its front end and a laterally directed rear discharge opening in one side thereof, a blower adjacent the inlet opening of the tunnel and rotatable about an axis extending longitudinally of the tunnel for creating a jet of gas through said tunnel for discharge through said rear opening to compensate for the torque effect of said wing structure, the side wall of said tunnel having a lateral by-pass opening adjacent said inlet opening through which some of said gas jet can be by-passed for controlling turning of the helicopter, a plurality of radially disposed gas directing vanes mounted adjacent the rear of said blower and adjacent said by-pass opening for straightening out the gas flow from said fan, and an inwardly opening flap by-pass valve having one end pivotally mounted adjacent the rear of said by-pass opening for controlling the by-pass of said jet through the by-pass opening, said valve being positioned between adjacent vanes of said plurality of directing vanes.

STANLEY HILLER, JR.

REFERENCES CITED

The following references are of record in the file of this patent:

UNITED STATES PATENTS

| Number | Name | Date |
|---|---|---|
| 1,697,770 | Kreikenbohm | Jan. 1, 1929 |
| 1,704,895 | Higby | Mar. 12, 1929 |
| 1,742,461 | Cuddy | Jan. 7, 1930 |
| 1,922,167 | Leray | Aug. 15, 1933 |
| 2,006,805 | Gwinn | July 2, 1935 |
| 2,365,328 | Bell | Dec. 19, 1944 |
| 2,369,652 | Avery | Feb. 20, 1945 |
| 2,419,604 | Stanley | Apr. 29, 1947 |

FOREIGN PATENTS

| Number | Country | Date |
|---|---|---|
| 883,462 | France | Mar. 22, 1943 |